April 28, 1925.
C. A. LOOK
1,535,927
BEVERAGE COOLER
Filed July 9, 1924
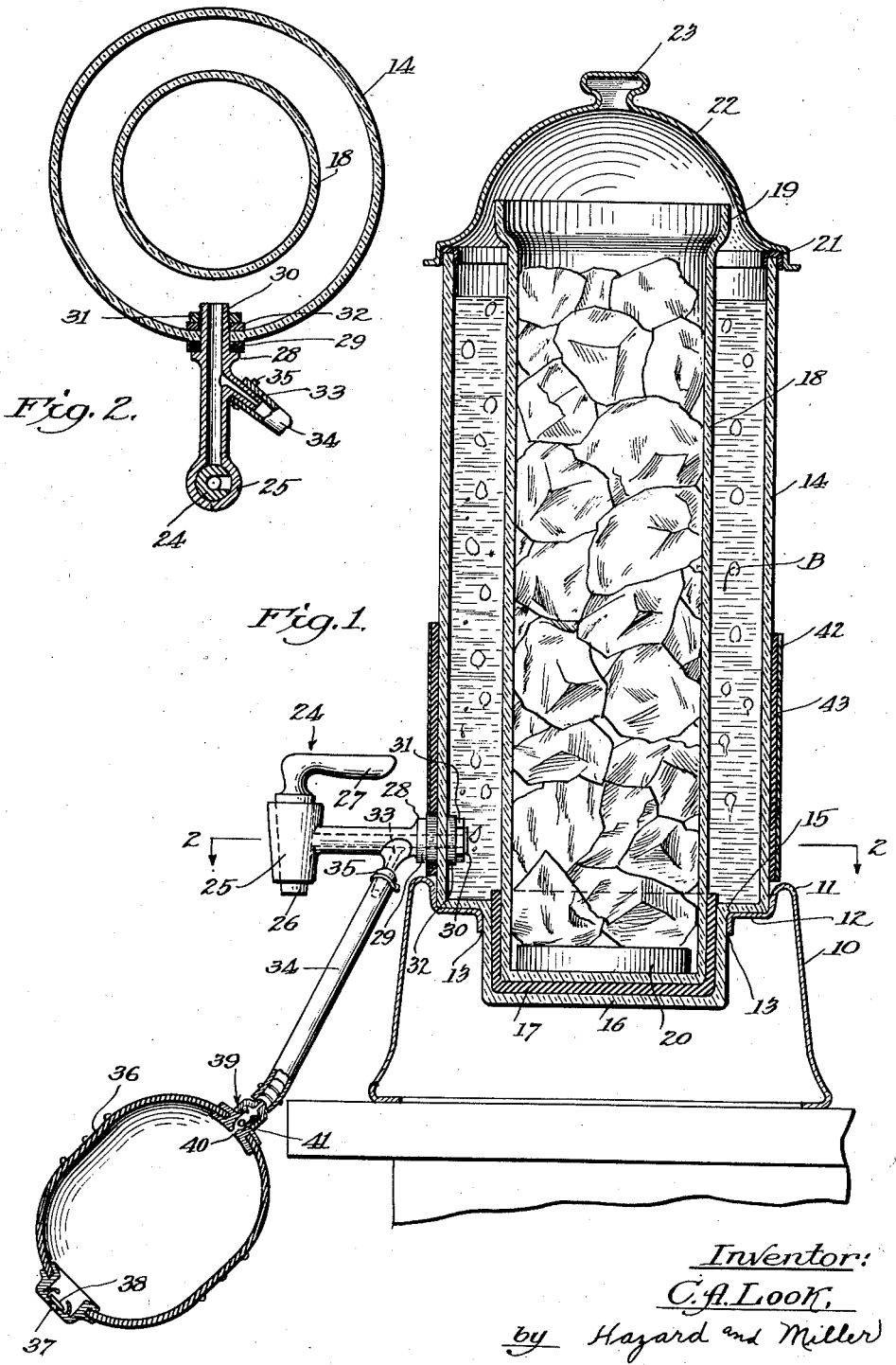
Inventor:
C. A. Look,
by Hazard and Miller
Attorneys.

Patented Apr. 28, 1925.

1,535,927

UNITED STATES PATENT OFFICE.

CARROL A. LOOK, OF LOS ANGELES, CALIFORNIA.

BEVERAGE COOLER.

Application filed July 9, 1924. Serial No. 724,975.

*To all whom it may concern:*

Be it known that I, CARROL A. LOOK, a citizen of the United States, residing at Los Angeles, in the county of Los Angeles and State of California, have invented new and useful Improvements in Beverage Coolers, of which the following is a specification.

This invention relates to receptacles adapted to hold and cool beverages.

An object of this invention is to provide an improved receptacle wherein the parts are so arranged as to eliminate the possibilities of breaking.

Another object of this invention is to provide an improved beverage cooler in which the beverage is disposed in a compartment arranged around a second compartment adapted to hold cracked ice.

A further object of this invention is to provide a beverage cooler with means for forcing air into the beverage, causing circulation in the beverage and tending to aerate it.

With the foregoing and other objects in view which will be pointed out in the following detailed description, reference is had to the accompanying drawings for an illustrative embodiment of my invention in a preferred form, wherein:

Figure 1 is a vertical section taken through the beverage cooler, and

Fig. 2 is a horizontal section taken substantially on the line 2—2 of Fig. 1.

Referring to the accompanying drawings in which similar reference characters designate similar parts, a suitable stand 10 is provided having an upwardly extending rim portion 11 and an inwardly extending horizontal flange 12 providing a central opening 13 in the stand. Upon the stand 10 is placed a receptacle 14, herein shown as being cylindrical and having integral therewith a bottom 15 provided with a central cup-like depression 16. A cup-like member 17, preferably formed of soft rubber or of similar flexible material, is disposed within the cup-like depression 16 and is adapted to receive and firmly hold a cylindrical jar 18 disposed within the outer receptacle 14.

This cylindrical jar 18 has an outwardly flaring neck portion 19 and is adapted to hold cracked ice, as shown in Fig. 1, to cool the beverage disposed in the compartment formed between the jar 18 and the outer receptacle 14. In order to reduce any tendency of the cylindrical jar 18 from floating within the beverage B, a suitable weight 20 may be placed in the bottom thereof.

Upon the rim of the outer receptacle 14 a channelled flexible member 21, preferably formed of rubber, is placed, and a cover 22 provided with a suitable knob or handle 23 is adapted to rest upon the channelled member 21 and cover both the inner and outer receptacles.

A faucet, generally designated at 24, is provided in the outer receptacle 14 near the bottom thereof and through which the beverage B may be withdrawn. This faucet is of more or less conventional construction, having a valve seat 25 to receive a tapering valve 26 provided with a handle 27. The faucet 24 is secured to the outer receptacle 14 by providing a shoulder 28 which bears against a rubber washer 29 upon the outside of the outer receptacle 14, and a threaded nipple portion 30 extends through the outer receptacle 14 to receive a nut 31 adapted to be tightened down upon a rubber washer 32 upon the inside of the outer receptacle 14, thereby holding the faucet 24 rigidly in position. The body of the faucet 24 has formed integral therewith a branch passageway 33 to which a suitable conduit 34, preferably formed of rubber, may be secured by means of a clamp 35. Upon the opposite end of the conduit 34 is secured a bulb 36, also of conventional construction, which enables air to be drawn through an aperture 37 past a closure 38 and forcing past a suitable check valve 39 which consists of a small opening 40 against which a ball 41 is drawn while air is being admitted to the bulb 36.

If desirable, I may provide an aluminum band 42 disposed about the lower half of the outer receptacle 14 and spaced therefrom by a rubber sleeve 43, which band and sleeve are adapted to protect the lower half of the outer receptacle 14; and as the sleeve 43 is formed of rubber, its insulating qualities may serve to keep the drink within the receptacle cool.

It is seen that I have provided an improved beverage cooler wherein the glass or fragile parts are separated from each other by flexible or rubber spacers. Means is provided for forcing air into one of the compartments of the cooler through a portion of the faucet, so that circulation and means for aerating the beverage is provided.

In cases where fruit juices, such as orange juice or the like, are kept in the cooler, any sediment which tends to collect near the bottom of the beverage compartment may be removed or blown away from the entrance to the faucet. As shown, the flaring neck of the cylindrical jar 18 is adjacent the cover 22 so that as bubbles rise within the beverage, there is no tendency of any of the beverage to be splashed over into the ice compartment.

I have found that by means of the improved container, it is customary for drink or beverage vendors to lift the inner or ice receptacle 18 from the depression in the bottom of the outer container 14. This allows the beverage B to flow into the depression and upon allowing the inner or ice receptacle 18 to fall into the depression, this receptacle acts as a type of piston, forcing the beverage from the depression upwardly around the shock absorber 17, and in this manner pulp and other sediment which tends to settle upon the bottom of the outer receptacle may be easily, quickly and efficiently stirred up.

It is to be understood that various changes may be made in the details of construction without departing from the spirit of the invention or in scope as defined by the appended claims.

I claim:

1. A beverage container comprising an outer receptacle, a bottom formed integral therewith, said bottom having a depression formed therein, and an inner receptacle adapted to fit within and substantially occupy said depression.

2. A beverage container comprising an outer receptacle, an inner receptacle disposed within said outer receptacle, a resilient member mounted upon the top edge of the outer receptacle, said resilient member having depending flanges gripping the sides of the outer receptacle so as to maintain it thereon and a cover adapted to rest upon said resilient member and cover both receptacles.

3. A beverage container comprising an outer receptacle, a bottom formed integral therewith, said bottom having a depression formed therein, an inner receptacle adapted to fit within and substantially occupy said depression, and a shock absorbing member arranged between said inner and outer receptacles within said depression.

4. A beverage container comprising an outer receptacle, an inner receptacle disposed within the outer receptacle, a resilient member mounted upon the top edge of the outer receptacle and having a flange extending downwardly within the interior of the outer receptacle, and a cover adapted to rest upon said resilient member and cover both receptacles.

5. A beverage container comprising a stand having a depressed top and an opening formed therein, an outer receptacle having a depression formed in its bottom and adapted to fit within said opening, and an inner receptacle adapted to fit within said depression.

6. A beverage container comprising a receptacle adapted to hold liquids, dispensing means adapted to withdraw liquid from said receptacle, and means for forcing air into said receptacle through a liquid conducting portion of said dispensing means.

7. A beverage container comprising a receptacle, a faucet communicating with said receptacle and arranged near the bottom thereof, and a bulb associated with said faucet whereby air may be forced into said receptacle through a liquid conducting portion of said faucet.

8. In a beverage container, an outer receptacle having a bottom in which is formed a depression, said depression being adapted to receive and to be substantially occupied by an inner receptacle.

9. A beverage container comprising an outer receptacle having a depression formed in its bottom, an inner receptacle having its bottom extend into and substantially occupy said depression, and a stand for the container, said stand presenting substantially flat top surfaces engaging the underside of the bottom of the outer receptacle and having an aperture therein adapted to receive the projection formed upon the bottom of the outer receptacle in providing said depression.

10. In a beverage container, a receptacle, a faucet secured to the receptacle for withdrawing fluid therefrom, and means for forcing air through said faucet into said receptacle so as to agitate the fluid in the faucet and in the receptacle.

In testimony whereof I have signed my name to this specification.

C. A. LOOK.